US011875763B2

(12) United States Patent
Moore

(10) Patent No.: US 11,875,763 B2
(45) Date of Patent: Jan. 16, 2024

(54) COMPUTER-IMPLEMENTED METHOD OF DIGITAL MUSIC COMPOSITION

(71) Applicant: Syntheria F. Moore, New Gardens, FL (US)

(72) Inventor: Syntheria F. Moore, New Gardens, FL (US)

( * ) Notice: Subject to any disclaimer, the term of this patent is extended or adjusted under 35 U.S.C. 154(b) by 472 days.

(21) Appl. No.: 17/190,263

(22) Filed: Mar. 2, 2021

(65) Prior Publication Data

US 2021/0272543 A1 Sep. 2, 2021

Related U.S. Application Data

(60) Provisional application No. 62/984,273, filed on Mar. 2, 2020.

(51) Int. Cl.
*G10H 1/00* (2006.01)

(52) U.S. Cl.
CPC ..... *G10H 1/0025* (2013.01); *G10H 2210/105* (2013.01); *G10H 2210/111* (2013.01); *G10H 2210/131* (2013.01); *G10H 2210/341* (2013.01); *G10H 2220/126* (2013.01)

(58) Field of Classification Search
CPC ........... G10H 1/0025; G10H 2210/105; G10H 2210/111; G10H 2210/131; G10H 2210/341; G10H 2220/126
USPC .......................................................... 84/609
See application file for complete search history.

(56) References Cited

U.S. PATENT DOCUMENTS 5,792,971 A * 8/1998 Timis ..................... G10H 7/004 700/87
7,982,121 B2 * 7/2011 Randle ..................... G10H 3/12 84/611
11,037,538 B2 * 6/2021 Estes ........................ G10H 1/38
2007/0221044 A1 * 9/2007 Orr ...................... G10H 1/0025 84/609
2010/0288106 A1 * 11/2010 Sherwani ............ G10H 1/0025 84/609
2017/0263225 A1 * 9/2017 Silverstein ............ G10H 1/368
2017/0263227 A1 * 9/2017 Silverstein ............ G10H 1/368
2019/0237051 A1 * 8/2019 Silverstein .............. G06N 7/01
2021/0110802 A1 * 4/2021 Estes .................... G10H 1/0025
(Continued)

FOREIGN PATENT DOCUMENTS

CA 2996784 A1 * 12/2010 .......... G06F 3/0481
CA 2843437 A1 * 2/2013 .......... G06F 3/0481
GB 2606522 A * 11/2022 .......... G10H 1/0025

*Primary Examiner* — Christina M Schreiber
(74) *Attorney, Agent, or Firm* — Mark C. Johnson; Johnson Dalal

(57) ABSTRACT

A computer-implemented method of digital music composition that creates a digital multi-genre musical composition track by downloading a host digital music track of a first genre and two or more separate donor multi-genre musical tracks, and then selectively modulating the instruments and rhythmic patterns of the donor musical tracks by manipulating the rhythmic patterns. The manipulation includes manipulating at least one of the intensities, frequency, sound, beat, and rhythm of the rhythmic pattern. The manipulated donor musical tracks are then integrated into the host musical track to create a combined digital multi-genre musical composition track, which can be downloaded, saved in a file, and replayed as needed.

19 Claims, 10 Drawing Sheets

(56) References Cited

U.S. PATENT DOCUMENTS

2021/0272543 A1* 9/2021 Moore ..................... G10H 1/40
2022/0108674 A1* 4/2022 Vorobyev ............. G10H 1/0058

* cited by examiner

COMPUTER-IMPLEMENTED METHOD OF DIGITAL MUSIC COMPOSITION

FIELD OF THE INVENTION

The present invention relates generally to a computer-implemented method of digital music composition, and, more particularly, relates to a method that selectively modulates the instruments and rhythmic patterns of two or more separate donor multi-genre musical tracks, and integrates the donor musical tracks into a host musical track having its own genre, so as to create a combined digital multi-genre musical composition track.

BACKGROUND OF THE INVENTION

Typically, mixing audio for recombination into a final music digital track involves digital audio file archiving, compression, encoding, transmission, decoding, and playback. Digital music software applications are designed to help the composer by combining portions of two or more audio signals together. This can include the combination of rhythmic patterns, sound, beat, and tempo for a musical score. However, analysis methods for separation of audio and automatic separation and/or recombination of the audio are typically complex and tend to not produce coherent and likeable and explainable remixes or mashups. The novelty of this invention balances that theory by its production of coherent remixes or mashups. In essence the inventor took something that, on its face, is not supposed to work but made it work; thereby, creating a new genre, genre fusion.

Generally, digital music software programs are downloadable on a processor, and operable through a graphical user interface (GUI). The GUI facilitates the editing of the music tracks, including the rhythmic pattern thereof. Additionally, the beat, timbre, and other sound functions can also be adjusted through the GUI. Often, the GUI has a standardized screen layout containing a graphical representation of the current state of the composed multimedia work, and an adjacent screen layout contains graphical controls which manage the playback of the multimedia content. This can be used to combine multiple music tracks, rhythmic patterns, genres, and other musical components; though not always with perfect sound results.

The prior art teaches various devices and methods that create a digital multi-genre musical composition track which incorporates a modulated donor rhythmic pattern. However, such prior art lacks the ability to selectively modulate the instruments and rhythmic patterns of two or more separate multi-genre musical tracks so as to create a new digital multi-genre musical composition track that includes select musical elements and rhythmic patterns from any number of the tracks used.

Therefore, a need exists to overcome the problems with the prior art as discussed above.

SUMMARY OF THE INVENTION

The invention provides a computer-implemented method of digital music composition that creates a digital multi-genre musical composition track by downloading a host digital music track of a first genre, and downloading two or more separate donor multi-genre musical tracks, and then selectively modulating the instruments and rhythmic patterns of the donor musical tracks by manipulating the rhythmic patterns. The manipulation of the rhythmic patterns includes adjusting at least one of the intensities, frequency, sound, beat, and rhythm. The manipulated donor musical tracks are then integrated into the host musical track to create a combined digital multi-genre musical composition track, which can be downloaded, saved in a file, and replayed as needed. The method overcomes the hereinafore-mentioned disadvantages of the heretofore-known devices and methods of this general type.

With the foregoing and other objects in view, there is provided, in accordance with the invention, a computer-implemented method of digitally composing a multi-genre musical composition with pre-existing digital musical tracks. The method comprises the steps of providing a processor operably coupled to a memory resident with a software application operably configured to identify and digitally manipulate a plurality of rhythmic patterns on a digital user interface.

Another Step may include providing an electronic display. The electronic display provides an interface for viewing, manipulating, and playing the digital music tracks.

Yet another Step comprises initiating a musical composition session using the software application, the musical composition session including: uploading a host digital music track of a first genre and viewing, over the digital user interface on the electronic display, a plurality of digital host musical elements each with a rhythmic pattern having a starting time point and selectively modifiable by a user.

The initiating Step also includes uploading a donor digital music track of a second genre, different than the first genre, and viewing, over the digital user interface on the electronic display, a plurality of digital donor musical elements each with a rhythmic pattern having a starting time point and selectively modifiable by a user.

Another Step of the method comprises bringing a digital play head to a timing point aligned with the starting time points of the rhythmic pattern for each of the plurality of digital host and donor musical elements.

Yet another Step includes manipulating at least one of the intensity and frequency of the rhythmic pattern for at least one of the plurality of digital donor musical element to generate a modulated donor rhythmic pattern, thereby generating a more harmonic digital multi-genre musical composition.

Yet another Step comprises creating a digital multi-genre musical composition track including the modulated donor rhythmic pattern.

In accordance with a further feature of the present invention, the musical elements comprise a musical instrument or a human vocal.

In accordance with a further feature of the present invention, the genres include at least one of the following: blues music, jazz music, rhythm and blues music, rock and roll music, rock music, country music, soul music, and dance music, and all other genres compatible with program.

In accordance with a further feature a further step comprises, substituting one or more subsequent donor digital music tracks of a subsequent genre for the donor digital music track of the second genre.

In accordance with a further feature of the present invention, the step of manipulating, further comprises cutting a portion of the rhythmic pattern from the digital donor musical elements. The copy and paste type functionality of cutting a portion of the rhythmic pattern enables the system to duplicate the same track thereby using the same rhythmic pattern but using two different instruments or keep the same instrument to give an orchestral-like air, i.e. Similar to a symphony where there are 10 people playing the flute and playing the same sheet of music, a track can be imported (copy) from the donor and duplicated to the number of times desired and change made to the instruments at will. The instruments can be changed to 3 flutes, 3 violins and 4 horns as if they were 10 people reading and playing.

In accordance with a further feature of the present invention, it is possible to cut a desired section; small or large, and loop that section for the entire length of the song or less. This is at the user's discretion. This concept is based on the example of a player who is playing the piano on the instrumental version of Bailamos. The cutting manipulation allows for the inclusion of sound as if the player is actually playing an instrument. However, it is significant to note that integrity matters and it should be noted if this manipulation is effective to this point.

In accordance with a further feature of the present invention, the step of manipulating, further comprises looping a portion of the rhythmic pattern from the digital donor musical elements.

In accordance with a further feature of the present invention, the step of manipulating, further comprises adding an additional rhythmic pattern to the digital donor musical elements.

In accordance with a further feature of the present invention, the processor includes at least one of the following: a computer, a laptop, a smart phone, a tablet, and an electronic device.

In accordance with a further feature of the present invention, the digital music tracks include at least one of the following files: MPEG Layer-3, Wave, and an audio file format.

In accordance with a further feature, a step further comprises, composing the donor digital music track of the second genre, different than the first genre, and viewing, over the digital user interface on the electronic display, the plurality of digital donor musical elements each with the rhythmic pattern having the starting time point and selectively modifiable by the user. This is useful in that the player can use any rhythmic patterns and have them begin at the beginning of a song, 10 seconds later, in the middle of composition, or towards the ending. One, two or all of these options are possible.

In accordance with a further feature, a step further comprises, incorporating and viewing, over the digital user interface on the electronic display, a plurality of digital host and donor musical elements, each with a rhythmic pattern having a starting time point and selectively modifiable by a user.

In accordance with a further feature, a step further comprises, adjusting the starting time points of the rhythmic pattern to read 00:00 before the user manipulates the intensity and frequency of the rhythmic pattern for each digital musical element.

In accordance with a further feature of the present invention, the rhythmic pattern comprises a time code, the time code including at least one of the following: hours, minutes, seconds, and frames.

In accordance with a further feature, a step further comprises, manipulating at least one of the intensity, frequency, sound, beat, and rhythm of the rhythmic pattern for at least one of the plurality of digital donor musical element to generate a modulated donor rhythmic pattern, thereby generating a more harmonic digital multi-genre musical composition.

In accordance with a further feature, a step further comprises, downloading the digital multi-genre musical composition track from the software application and the digital user interface onto the memory resident on the processor or an external memory drive.

In accordance with a further feature, a step further comprises, saving the downloaded multi-genre musical composition track in a file.

In accordance with another feature, a step further comprises, running the file to play the digital multi-genre musical composition track.

Although the invention is illustrated and described herein as embodied in a computer-implemented method of digital music composition, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill or advanced skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
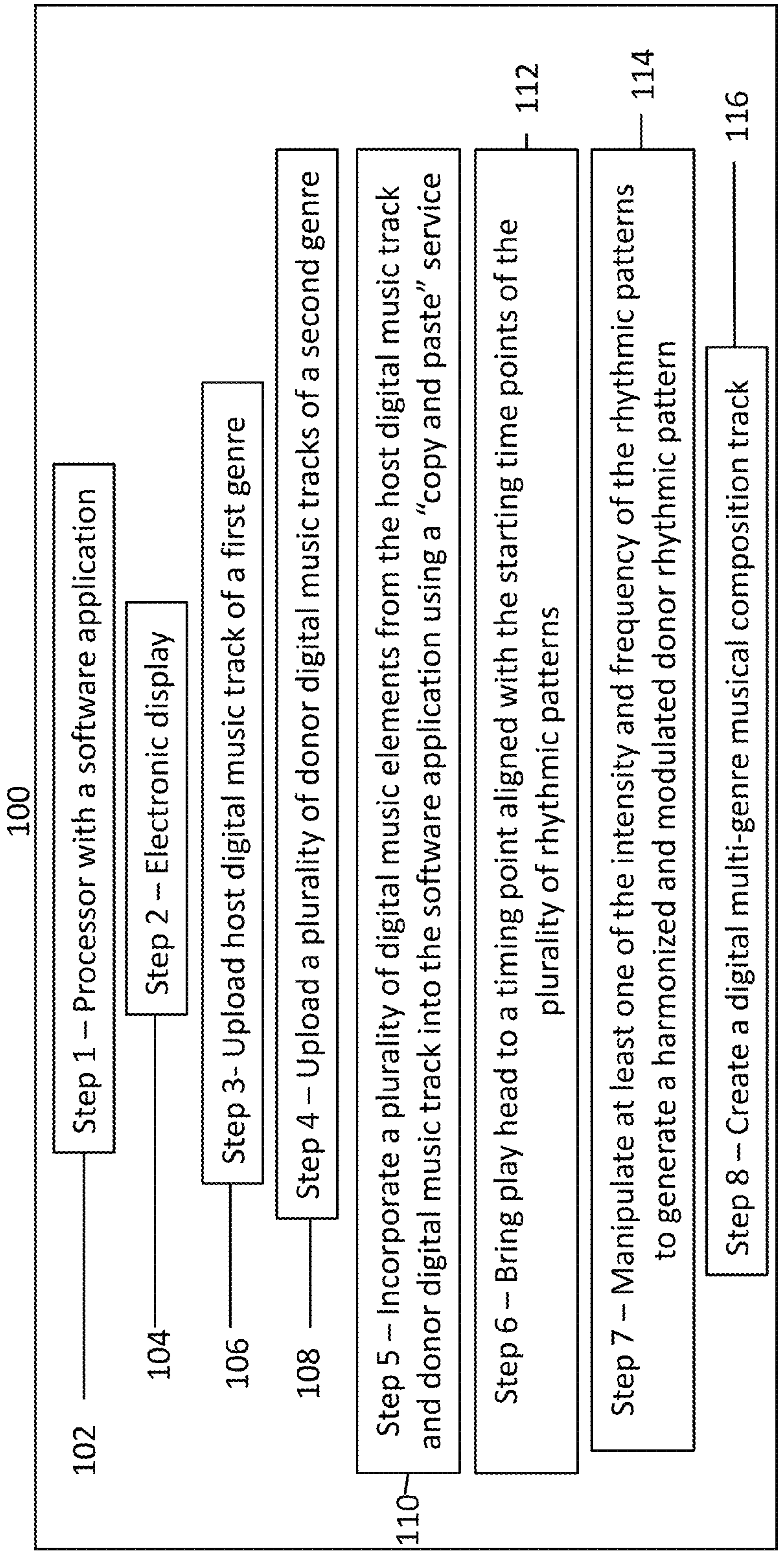
FIG. 1 is a block diagram flowchart featuring the steps involved in a computer-implemented method of digital music composition, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The invention described herein provides a computer-implemented method of digital music composition that overcomes known disadvantages of those known devices and methods of this general type and that facilitates the creation of a digital multi-genre musical composition track which incorporates a modulated donor rhythmic pattern. Known embodiments of the present invention lack the ability to selectively modulate the instruments and rhythmic patterns of two or more separate multi-genre musical tracks so as to create a digital multi-genre musical composition track that includes select musical elements and rhythmic patterns from any number of the tracks used.

The present invention overcomes these known disadvantages by allowing a user, or composer, to choose a host track and a donor track to dissect into a plurality of digital musical elements each with its own rhythmic pattern. The user then selectively modulates the rhythmic patterns and features of each digital musical element to create one digital multi-genre musical composition comprised of multiple mixed tracks.

Although the invention is illustrated and described herein as embodied in a computer-implemented method of digital music composition, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

It is to be understood that the disclosed embodiments herein are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the musical elements, wherein "transverse" should be understood to mean a direction corresponding to a direction across the musical elements. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The attached figures are incorporated in and form part of the specification, and serve to further illustrate various embodiments and explain various principles and advantages all in accordance with the present invention. Moreover, it is believed that the invention will be better understood from a consideration of the following description in conjunction with the drawing figures, in which like reference numerals are carried forward.

The figures show several advantageous features of the present invention, but, as will be described below, the invention can be provided in several steps, sizes, combinations of features and components, and varying numbers and functions of the components. The invention consists of a computer-implemented method that achieves the goal of digitally composing a multi-genre musical composition using pre-existing digital musical tracks. This is accomplished through the composer's selective manipulation of the various musical elements of each track to achieve the desired rhythm, tempo, and overall acoustic sound.

Referring now to FIG. 1, one embodiment of the present invention is shown in a block diagram flowchart featuring the steps involved in a computer-implemented method 100 of digital music composition. This exemplary embodiment of the methodology features eight distinct steps, though this number may vary in different embodiments. Although FIG. 1 shows a specific order of executing the process steps, the order of executing the steps may be changed relative to the order shown in certain embodiments. Also, two or more steps shown in succession may be executed concurrently or with partial concurrence in some embodiments. Certain steps may also be omitted in FIG. 1 for the sake of brevity. In some embodiments, some or all of the process steps included in FIG. 1 can be combined into a single process.

In any case, the essences of the method are to enhance a host digital music track 300 by combining it with two or more donor digital music tracks 302*a-n* having different genres. This is accomplished through manipulation of the rhythmic patterns of the rhythmic pattern 402 by changing the starting time point 404, and cutting or looping the rhythmic pattern from the digital donor musical elements to achieve a final combined digital multi-genre musical composition track.

Figure 2:
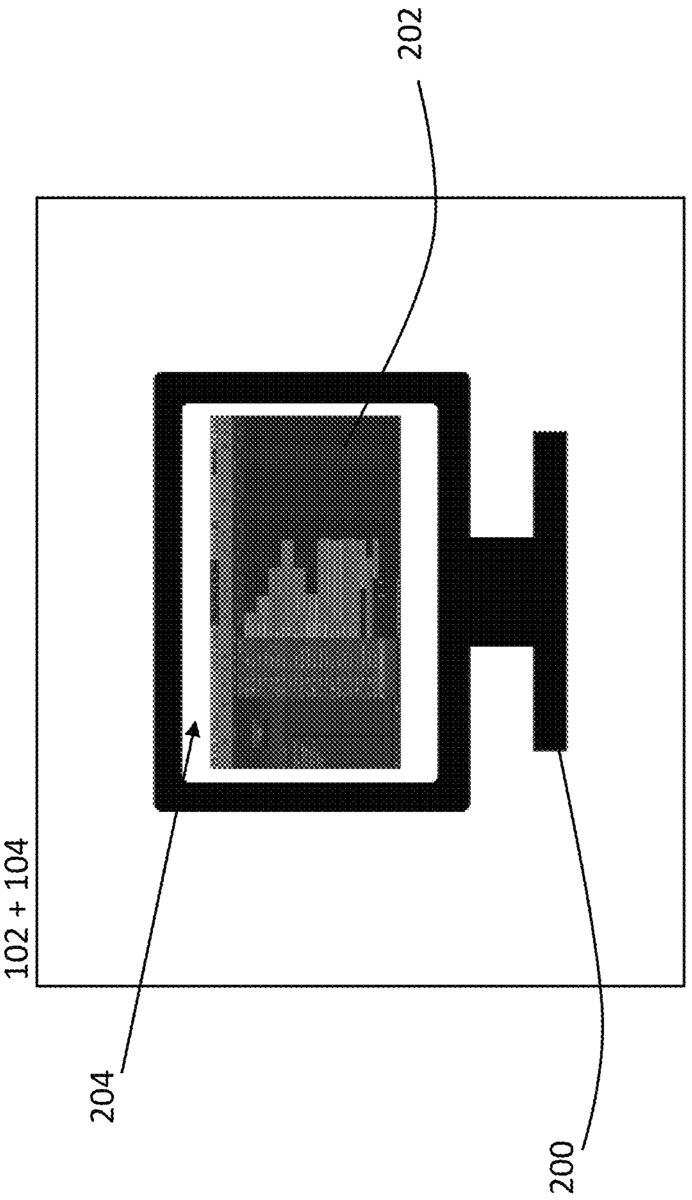
FIG. 2 is a frontal view of an exemplary a processor identifying and digitally manipulating a plurality of rhythmic patterns on a digital user interface, in accordance with the present invention.
Figure 3:
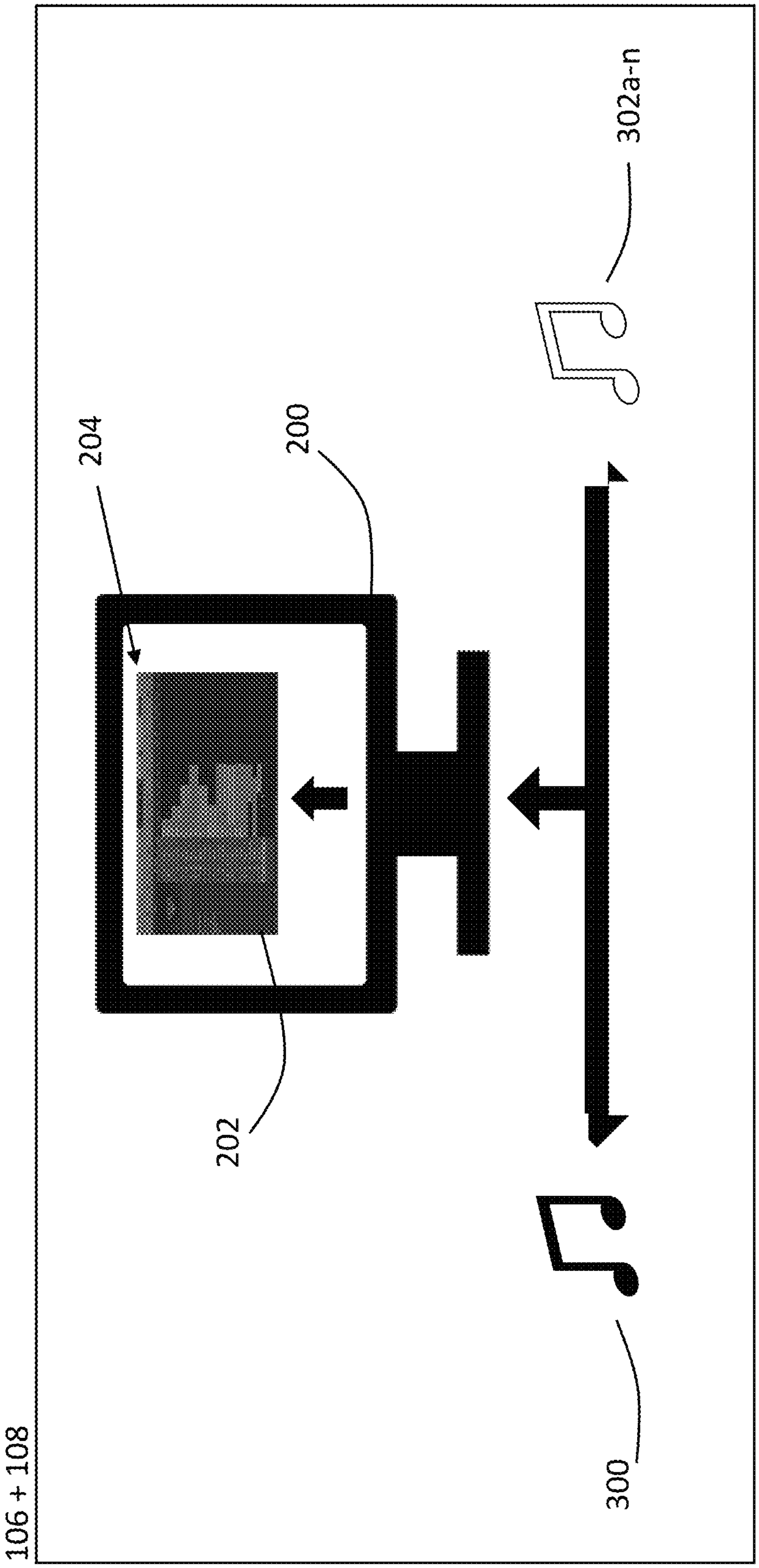
FIG. 3 is a frontal view of the processor identifying and digitally manipulating the rhythmic patterns, and uploading donor digital songs, in accordance with the present invention.

As best seen in FIG. 1 and FIG. 2, a first Step 102 of the present methodology involves a processor 200 operably coupled to a memory resident with a software application operably configured to identify and digitally manipulate a plurality of rhythmic patterns on a digital user interface 202. In an exemplary embodiment, the processor 200 is a computer or laptop, though the processor 200 may also be a smart phone, a tablet, or any other electronic device operably configured to a memory resident with a software application having the digital user interface 202 operably configured to identify and manipulate a plurality of rhythmic patterns.

In an exemplary embodiment, the software application used is Logic Pro, providing the digital user interface 202 whereby users may digitally mix and manipulate pre-existing digital musical tracks. Other digital audio workstations or musical instrument digital interface ("MIDI") sequencer software applications may be used in place of Logic Pro X, or any updates of the Logic Pro software, depending on the processor 200 of the user and the compatibility of the processor 200 with the particular software application and digital user interface 202 provided therein.

However, additional software applications, other than Logic Pro may be used. For example, FIG. 7 references a screenshot of an alternative software application 700 that is downloaded into a digital user interface 702. The software application 700 is operable to incorporate and view a host digital music track 704 and a donor digital music track 706. The alternative software application 700 may include Audacity™, which is a free and open source digital audio editor. However, other software applications that are operable for playing and modification of digital music may also be used.

A second Step 104 provides for an electronic display 204, typically built into the processor 200. The electronic display 204 provides an interface for viewing, manipulating, and playing the digital music tracks. The software application, or other comparable digital program, is installed or downloaded onto the processor 200. The electronic display 204 displays the digital user interface 202 and facilitates interaction with the same by the user. In various embodiments, the electronic display 204 may be a computer or laptop screen, a smartphone display, or a touch screen of any of the foregoing. Certain digital user interfaces 202 may be specially adapted for operation on a smartphone or other cellular device and feature versions of the digital user interface 202 that are designed to fit and display appropriately on the electronic display 204 of a cellular device.

The Steps seen in FIG. 1 which follow Step 102 and Step 104 relate to the initiation of a musical composition session using the software application and the digital user interface 202. A Step 106 involves uploading a host digital music track 300 of a first genre onto the digital user interface 202. The host digital music track 300 serves as the base track that the user works off of during the musical composition session in order to produce the final combined digital multi-genre musical composition track.

The host digital music track 300 comprises one or more musical elements, i.e., instruments, vocals, digitally combined to form a musical score. The musical elements are played according to a genre of music. In some embodiments, the genres may include, without limitation, blues music, jazz music, rhythm and blues music, rock and roll music, rock music, country music, soul music, and dance music. One of the unique attributes of the present invention is the capacity to combine different genres in a substantially seamless combination musical track.

A next Step 108 involves uploading a plurality of donor digital songs that consist of music tracks 302*a-n* (hereinafter referred to as "donor digital music tracks 302*a-n*"), wherein "n" refers to any number greater than one, of a second genre. The user may selectively choose which features of the donor digital music track 302*a-n* to include, modulate, or exclude during the musical composition session. For example, the host digital music track 300 is a rhythm and blues music genre, and two donor digital music tracks 302*a-n* comprises of a rock music genre and a country music genre. The rhythm and blues music genre, the rock music genre, and the country music genre are combined into a smooth flowing, easy listening musical track through manipulation of the rhythmic patterns of the donor digital music tracks 302*a-n*, as described below.

In addition to Step 108 of uploading the donor digital songs, a user may also select to compose a donor digital song. Thus, another Step comprises, composing the donor digital music track of the second genre, different than the first genre, and viewing, over the digital user interface on the electronic display, the plurality of digital donor musical elements each with the rhythmic pattern having the starting time point and selectively modifiable by the user. The composition, rather than the downloading of potential donor music tracks allows for greater customization of the final combined digital music track. As with the downloaded donor music track, the composed version includes musical elements having a unique rhythmic pattern. Selecting the donor tracks can also depend on a desired instrument, interest or love of a particular genre from which the donor track is taken, thereby allowing the user to lean the composition towards any genre they desire with the assistance of their selection of instruments.

Once everything is properly connected, the equipment can be recorded and the manipulation of the rhythmic patterns can begin. During the playing of the rhythmic patterns another Step includes muting the host digital music track, or the donor digital music track, or both. The muting function, operable with a mute switch 1000 (See FIG. 10), is selective, based on the player's desired output, and allows the player to turn off a track while recording, so as not to have unwanted interference. Thus, the ability of the mute switch 1000 enables the player to create multiple versions of one song by providing greater flexibility in which portion of the track is not included.

In another example of using the mute switch 1000 a record has a Side A as the full version and Side B as the instrumental version. This can be mimicked by utilizing the digital or physical mute switch, tab, or button (collectively, "switch") 1000. The mute switch 1000 is switched to the OFF position, and the play head to the beginning and exported and bounced accordingly for the full version. The mute switch 1000 is switched to ON for the vocals, play head at 00:00 and you have the instrumental version. The mute switch 1000 is then switched OFF for the vocal and mute or another other rhythmic, frequency, or track. It is also significant to note that, when the entire composition is finalized and ready for export, bouncing and saving where the player wants, desktop folder, flash drive, etc., the mute switch 1000 must be 'OFF' so that the sound from all of the tracks are captured. Any track with the mute switch 1000 'ON' will not be included in the final saved mix.

Figure 10:
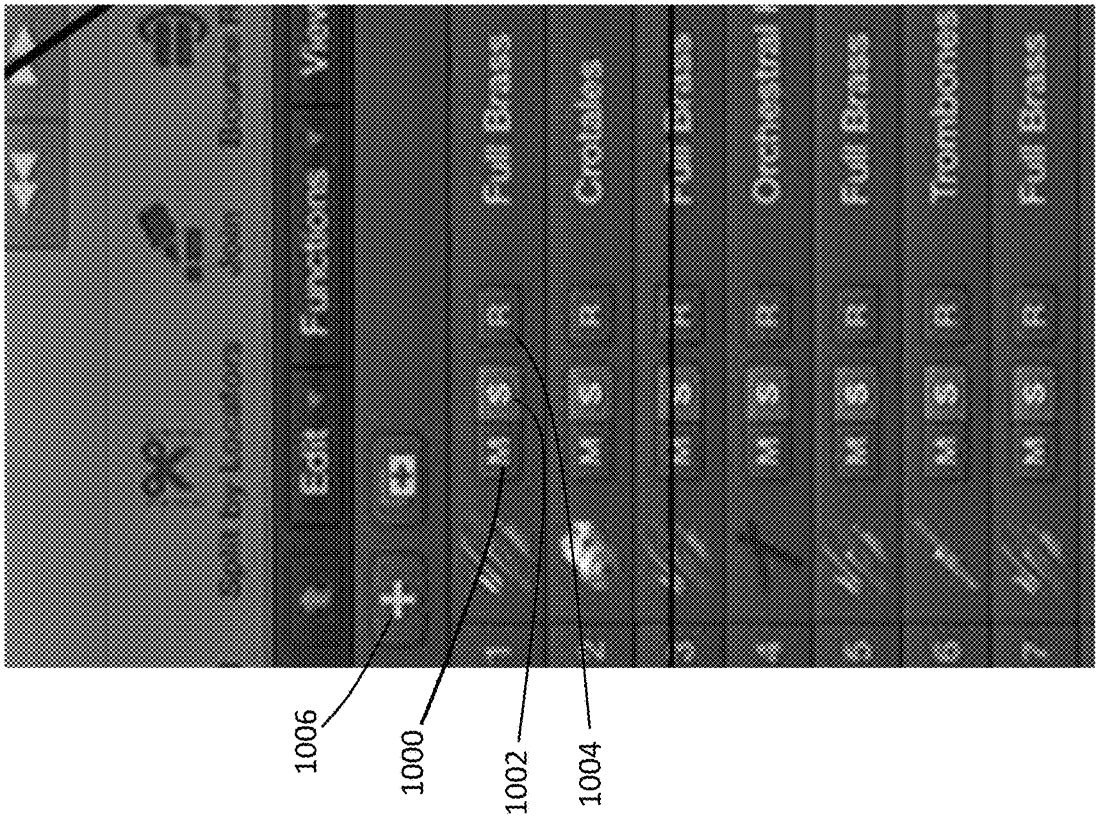
FIG. 10 is a screenshot of a display screen displaying a mute switch, a solo switch, a record switch, and an add track switch, in accordance with the present invention.

Thus, as FIG. 10 references, a screenshot of a display screen displays a mute switch 1000, a stop or solo switch 1002 (or a shortcut way of muting all tracks except one, e.g., if a user wants the solo button to select multiple tracks for listening, a user may also hold down the shift button when clicking the solo button), a record switch 1004, and an add track switch 1006. The player can selectively execute any of the switches to achieve a desired manipulation of the music tracks. For example, the player can record a voice for the singing aspect of the musical composition because of the MIDI plug-ins. By clicking the plus sign, or add track switch 1006 (+) the player adds, or opens, additional tracks. Once the track is added the player presses the record switch 1004 (R) to begin recording, making sure that all other tracks are muted with the mute switch 1000 (M), if the need be, and place the play head at the beginning and press the record button.

Next, the player hears the beep while wearing headphones. The player may then start singing. For the singing aspect, the player would prefer the tracks unmuted to hear the song that being sung, so as to know when to come in and pause as necessary. This same principle would apply to a player if playing the drums, keyboard or any other instrument. Once everything is plugged in and confirmed through the old testing, testing 1-2-3, there is nothing that can stop the player from conducting.

The act of uploading in Step 106 and Step 108 is generally done by having a file or copy, in MPEG Layer-3 (".mp3"), Wave (".wad"), or other comparable audio file format, of both the pre-existing host digital music track 300 and the pre-existing donor digital music track 302*a-n* on the hard drive or memory resident on the processor 200. Users may obtain a file or copy of the host digital music track 300 and the donor digital music track 302*a-n* by purchasing them through third-party websites or platforms, such as https://www.midi.com.au/, or by composing and recording them themselves. In some cases, and depending on the user, free digital music is also available for use as the host digital music track 300 or the donor digital music tracks 302*a-n*. A user must then select the option on the digital user interface 202 providing for upload of the files from the processor 200 to the digital user interface 202.

Deciding which host digital music track 300 and donor digital music track 302*a-n* to use and upload is entirely within the discretion and judgment of the individual user. Knowledge of different genres of music may assist the user in making this decision, as certain combinations of genres may produce more harmonic and acoustically pleasing composition tracks. Many factors may influence the user's digital music track selection, including the beats per minute ("bpm") and the compositional structures of both the host and donor tracks, as similar structures can reduce the amount of clashing chords of each digital music track. This methodology is user friendly and the user can make random selections if they are not musically inclined or do not know where to begin.

Further, the donor digital music tracks can be interchanged, added, or removed, once selected. This allows for greater flexibility in producing the final combined digital multi-genre musical composition track. Thus, another possible Step comprises substituting one or more subsequent donor digital music tracks of a subsequent genre for the donor digital music track of the second genre. The substitution of one donor digital music track for another, or subsequent music track allows the user to experiment with different genres and rhythmic patterns before producing the final combined digital multi-genre musical composition track. The ability to make these adjustments is called arrangement.

For example, a host digital music track 300 is a rhythm and blues genre, and a donor digital music track is a rock genre. After manipulating the rhythmic pattern of the donor digital music track, and listening to the combined music track, there may be too many bridges, or clashing chords. The donor rock genre can be substituted with a country genre music track and manipulated to achieve a final combined digital music track consisting of the rhythm and blues genre from the host music track, and the country genre from the newly substituted donor music track.

Figure 4:
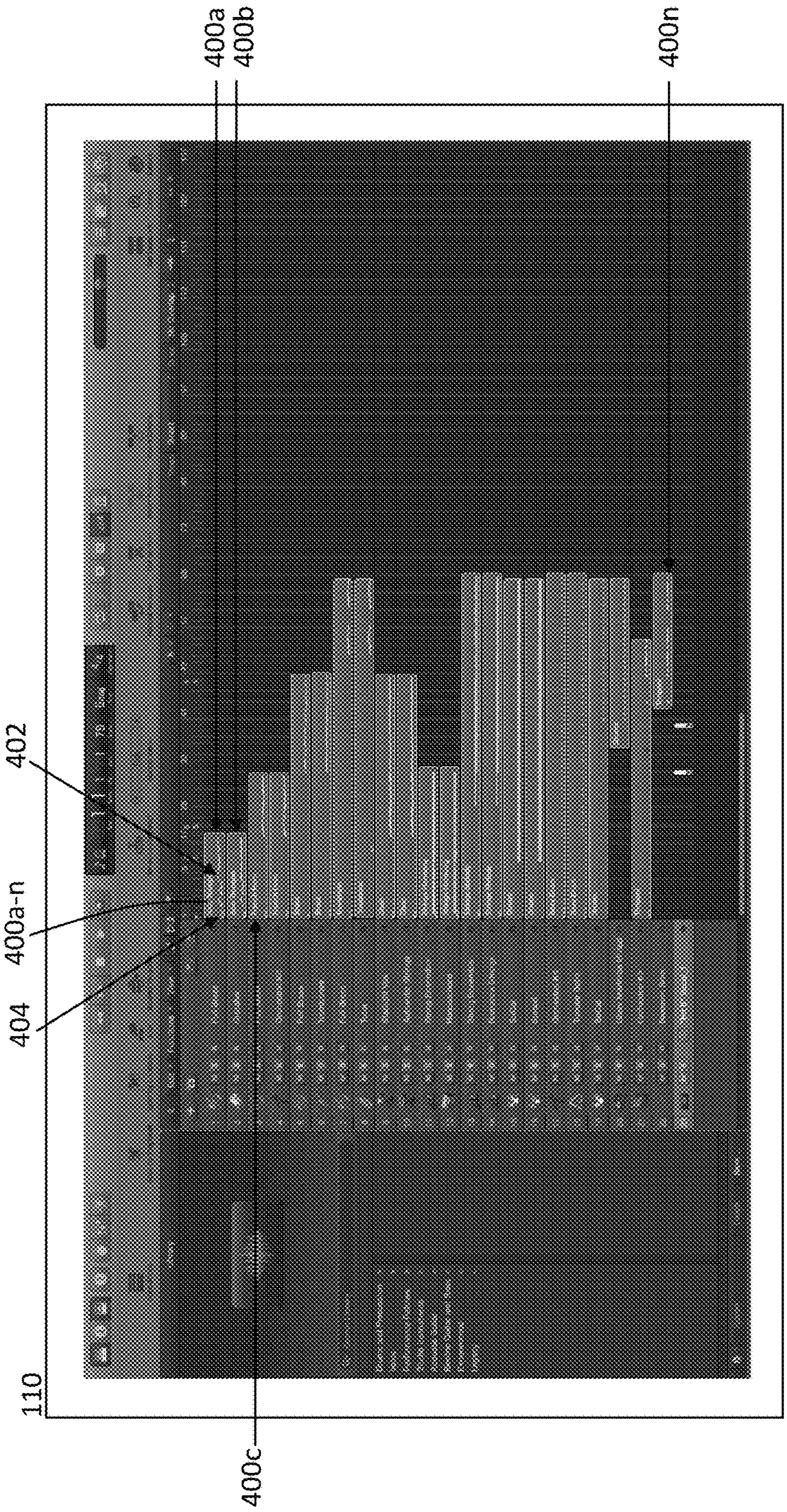
FIG. 4 is a frontal view of digital host and donor musical elements being displayed on a processor, in accordance with the present invention.

Referring now to FIG. 4, a next Step 110 involves incorporating and viewing, over the digital user interface 202 on the electronic display 204, a plurality of digital host and donor musical elements 400*a-n* ("digital musical elements"), wherein "n" refers to any number greater than one, of the host digital music track 300 and donor digital music track 302*a-n*. In some embodiments, the musical elements 400*a-n* may include a musical instrument or a human vocal. For example, FIG. 4 illustrates a first musical element as a solo trumpet. Another musical element shown is a French Horn. Additional musical elements include Brass, Trombone, a Choir (human vocal), Strings Harmony, and Strings Melody. Each musical element has its own track, and can be played with a unique genre.

Each of the plurality of digital musical elements 400*a-n* comprise a rhythmic pattern 402 having a starting time point 404 and selectively modifiable by a user. At this time, there is no known ending point of the time code within the rhythmic pattern. The solo trumpet musical element has its own rhythm, which can be likened to a time signature. For example, the solo trumpet plays along a timeline to form a succession of musical events contained within a single metric unit that corresponds to a single main beat. The rhythmic pattern 402 of the French Horn is more uniform than the solo trumpet, and may be adjusted along its timeline to start before or after the starting time point 404 of the solo trumpet. Also shown are the differences in rhythmic pattern between different musical elements.

The plurality of digital musical elements 400*a-n* each reflect and comprise a distinct acoustic feature or instrument featured in the specific digital music track(s) being viewed, i.e. the host digital music track 300 or donor digital music tracks 302*a-n*. FIG. 4 features merely one example of the acoustic features and instruments that may be reflected in the digital musical elements 400*a-n*. A first digital musical element 400*a* represents the solo trumpet instrument of the host digital music track 300 or donor digital music tracks 302*a-n*. A second digital musical element 400*b* represents the solo trumpet instrument of the host digital music track 300 or of another donor digital music track 302*a-n*. A third digital musical element 400*c* represents the French horn instrument of the host digital music track 300 or donor digital music tracks 302*a-n*.

Incorporating the plurality of digital musical elements 400*a-n* from the host digital music track 300 and from the donor digital music track 302*a-n* pursuant to Step 110 may be achieved through use of external or third-party "copy and paste" services, such as https://www.midicom.au/.

Figure 7:
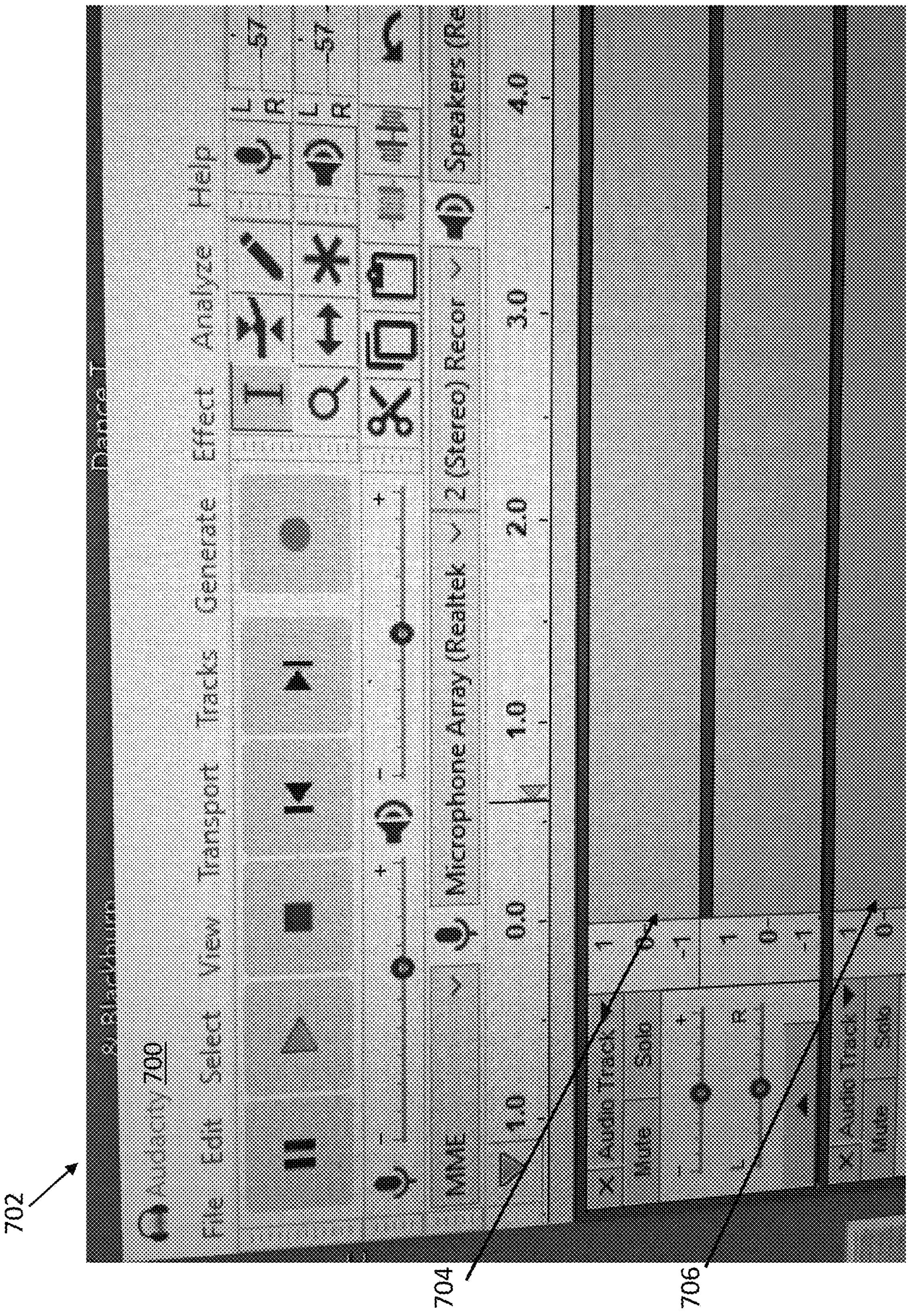
FIG. 7 is a screenshot of an alternative software application used to incorporate and view, over the digital user interface, the digital host and donor musical elements, which is also capable of computer related composition, although with limitations at this time, in accordance with the present invention.

For example, FIG. 7 references a screenshot of an alternative software application 700 downloaded into a digital user interface 702. The software application 700 is operable to incorporate and view a host digital music track 704 and a donor digital music track 706. The alternative software application 700 may include Audacity™, which is a free and open source digital audio editor. However, additional types of software applications operable to download and view the digital host and donor musical elements may also be used.

The starting time point 404 of the plurality of digital musical elements 400*a-n* refers to the very beginning of each digital musical element 400*a-n*, i.e. when the time listed for the digital musical element 400*a-n* reads 00:00. The starting time point 404 must be adjusted to read 00:00 before the user conducts any manipulations of the rhythmic pattern 402 for each digital musical element 400*a-n*. This is because the rhythmic patterns are not able to be read as an identifiable spoken or recognizable written language so the user needs to hear and note the location where the actual manipulation should occur. The rhythmic patterns are read in Time Code, i.e., H (hours); M (minutes); S (seconds); F (frames). This separation of time elements allows for a more refined manipulation of the rhythmic patterns of donor music tracks. Consequently, manipulations are properly conducted and reflected in a digital multi-genre musical composition track 900 created at the end of the musical composition session.

Figure 5:
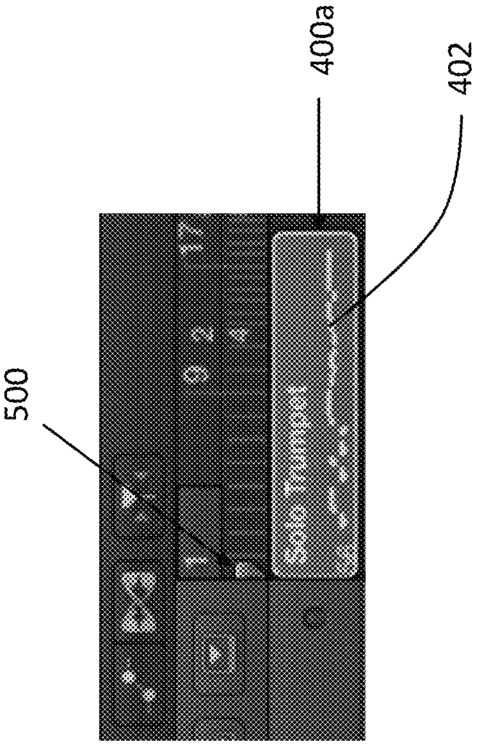
FIG. 5 is a screenshot of a digital play head aligned with the starting time point of the digital musical elements, in accordance with the present invention.

As best seen in FIG. 5, a further Step 112 involves bringing a digital play head 500 to a timing point aligned with the starting time point 404 of the plurality of digital musical elements 400*a-n* for the host digital music track 300 and the donor digital music tracks 302*a-n*. The starting time point 404 and digital play head 500 should be placed at the very beginning wherein the time listed is 00:00. This serves to adjust the starting time points of the rhythmic pattern to the time point of 00:00 before the user manipulates the intensity and frequency of the rhythmic pattern for each digital musical element.

Advantageously, Step 112, at the 00:00 time point ensures that any manipulations by the user are properly conducted and reflected in the digital multi-genre musical composition track 900 created at the end of the musical composition session. However, in other embodiments, the user has the flexibility, while setting the digital play head 500, to initiate the starting time point both, before or after, the 00:00 time. However, in a preferred embodiment, the starting time is at 00:00.

Figure 6:
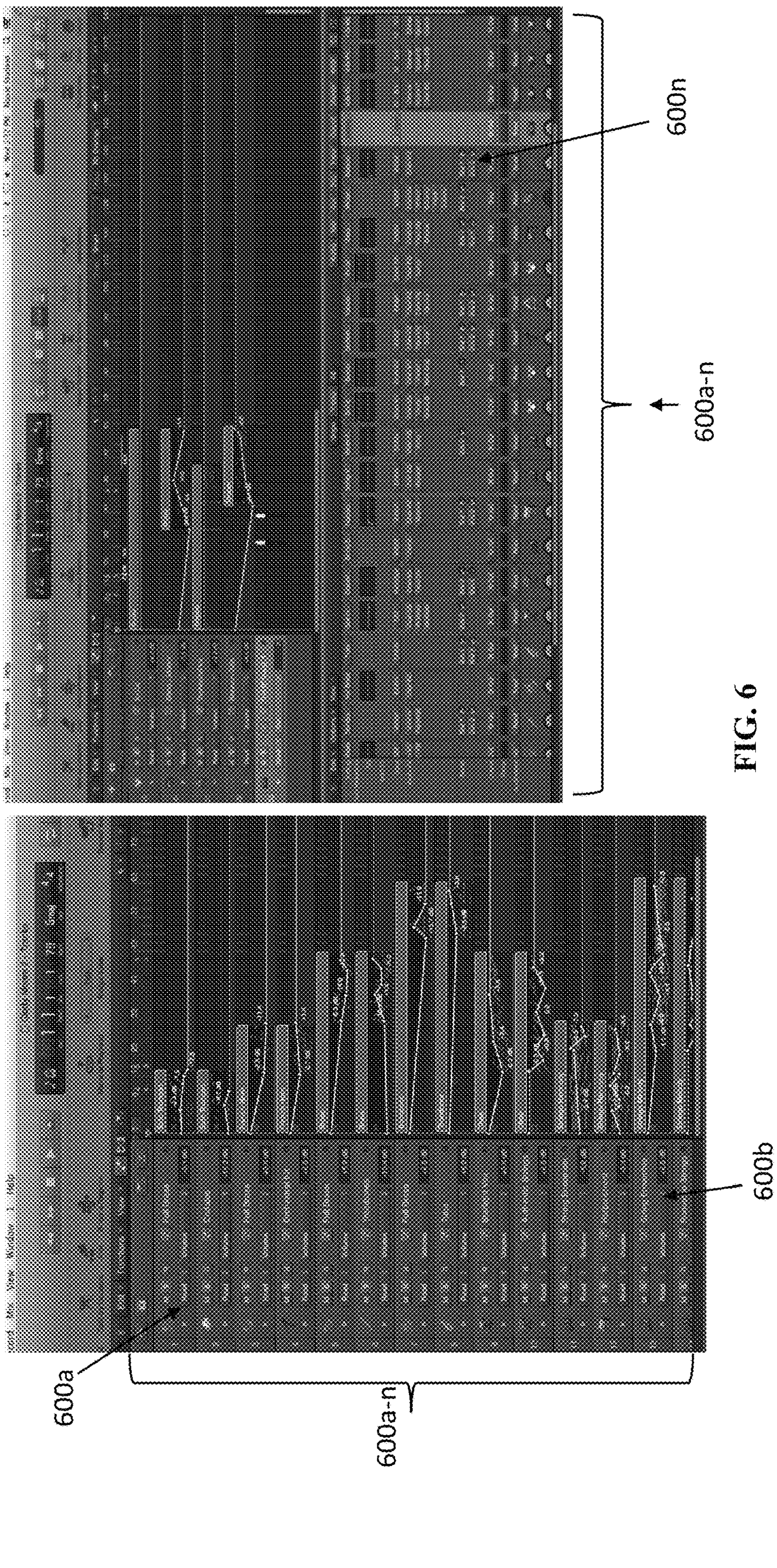
FIG. 6 is a screenshot of the digital donor musical elements adjusting the acoustic intensity and frequency of the rhythmic pattern for each of the digital musical elements, in accordance with the present invention.

A next Step 114, as best seen in FIG. 6, involves selectively manipulating at least one of a plurality of adjustment features 600*a-n*, wherein "n" refers to any number greater than one, displayed on the digital user interface 202. The adjustment features 600*a-n* relate to and affect the acoustic intensity and frequency of the rhythmic pattern 402 for each of the plurality of digital donor musical elements 400*a-n* displayed. Depending on the software application and digital user interface 202 used, the specific adjustment features 600*a-n* may vary in type and number. As used herein, "intensity" refers to the power carried by sound waves per unit area in a direction perpendicular to that area. As further used herein, "frequency" refers to the frequency of sound or the number of times a particular pattern of amplitudes repeats during one second.

A user may freely and selectively manipulate the adjustment features 600*a-n* to suit the desired acoustic sound. Typically, the adjustment features 600*a-n* will be manipulated so as to fit the desired sound, beat, and rhythm of the host digital music track 300, which serves as the base track for users. It is known in the art that the beat is the steady pulse that is felt in the tune. The rhythm is the actual sound of the notes, which in a song is equivalent to the words. The sound includes any tone with characteristics such as controlled pitch and timbre. The sound is produced by instruments in which the periodic vibrations are controlled by the performed.

In one example of manipulating the adjustment features 600*a-n* of a donor music track to suit the desired acoustic sound, a donor music track comprises a bass guitar from a rock genre song. Other musical tracks include different musical elements (instruments) with different rhythmic patterns. The bass guitar requires a specific harmony among the other tracks. Thus, the bass guitar track can be adjusted by lowering the rhythmic pattern, via automation manipulation, lower than the starting point for the bass guitar track. In another example of adjusting a donor music track, a drum from a rhythm and blues music track. The drum was played and recorded from the song in which it came. Thus, the drum was too powerful for the host music track. A kick and high-hat adjustment are lowered, so as to achieve a desired harmony between the drum music track and the host music track.

It is also known in the art that the blending of multiple digital music tracks, as disclosed above, naturally runs the risk of creating acoustic discord among the numerous competing sounds, i.e., clashing chords. Users would therefore be inclined to manipulate the adjustment features 600*a-n* in such a way as to generate a modulated donor rhythmic pattern 402, thereby creating a more harmonic digital multi-genre musical composition.

The manipulation to achieve the desired acoustic sound may include cutting or looping the rhythmic pattern from the digital donor musical elements. This serves not only to achieve the desired sound, but also to minimize clashing chords and other undesirable acoustic signals. Other digital music adjustments to the rhythmic pattern of the musical elements, known in the art, may also be utilized. For example, the step of manipulating, further comprises adding an additional rhythmic pattern to the digital donor musical elements.

Figure 8:
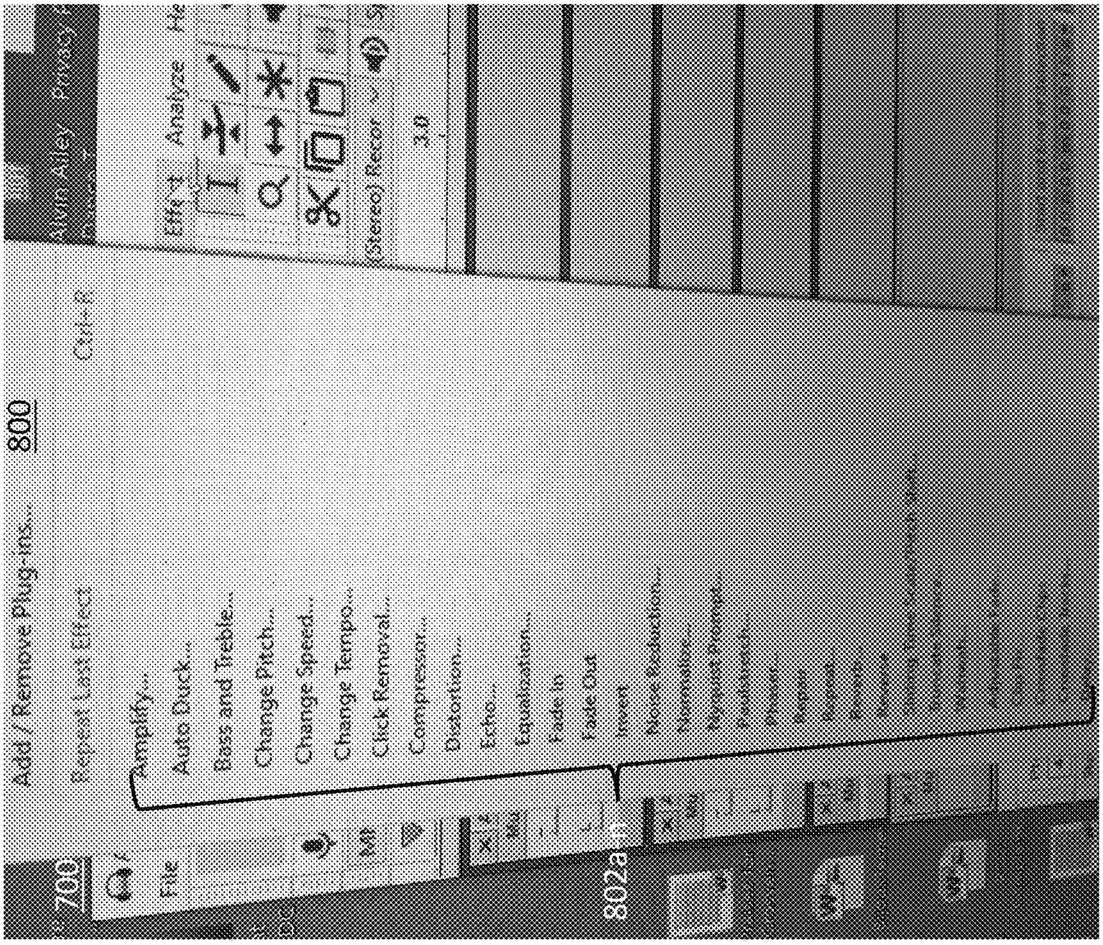
FIG. 8 is a screenshot of the alternative software application displaying a menu of adjustment features for digitally manipulating the rhythmic patterns for each of the digital musical elements, although with limitations at this time, in accordance with the present invention.

FIG. 8 references a screenshot of the alternative software application 700 displaying a menu 800 of adjustment features for digitally manipulating rhythmic patterns for each of the digital musical elements. As illustrated, the user may manipulate the rhythmic patterns through a plurality of adjustment features 802*a-n*, wherein "n" refers to any number greater than one, displayed on the digital user interface. The adjustment features may include, without limitation, amplify, bass and treble, change pitch, change speed, change tempo, reverb, reverse, and delay. When applied to the digital donor musical elements, the desired sound, beat, and rhythm can be fit to the host digital music track 300.

Figure 9:
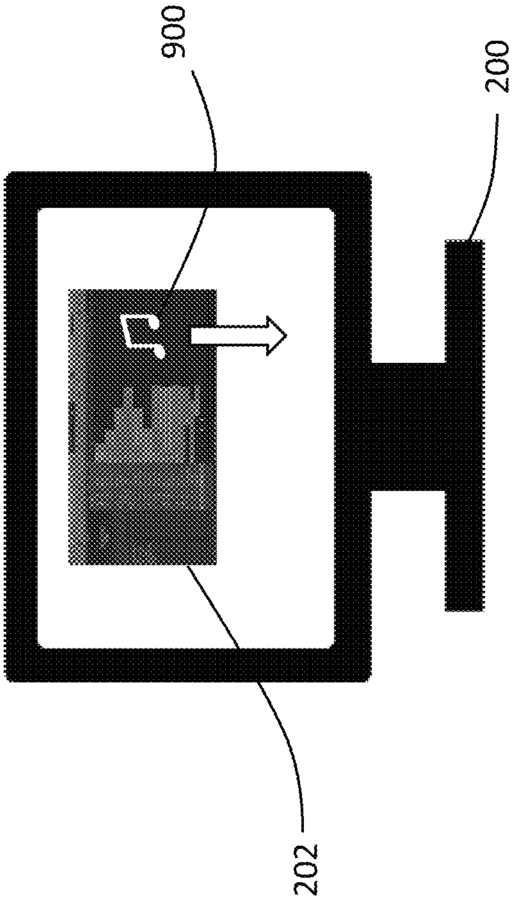
FIG. 9 is a screenshot of the creation of the digital multi-genre musical composition track, in accordance with the present invention.

Referring now to FIG. 9, once a user is satisfied with the adjustments made, they will take a final Step 116 and create the digital multi-genre musical composition track 900 comprising the modulated donor rhythmic pattern 402. To save the digital multi-genre musical composition track 900 for future use, a user may elect to download the digital multi-genre musical composition track 900 from the software application and digital user interface 202 onto the memory resident on the processor 200 or onto an external memory drive. Thereafter, the user may selectively run the file to play the digital multi-genre musical composition track 900 whenever they wish. This final Step may commonly be referred to as Exporting and Bouncing for saving on a hard drive, disc, or flash drive.

In some embodiments, the method 100 further includes a Step of downloading the digital multi-genre musical composition track 900 from the software application and the digital user interface onto the memory resident on the processor or an external memory drive. This allows the final musical product to be stored for future consumption. The downloading Step can be followed by a Step of saving the downloaded multi-genre musical composition track in a file. The file may include, without limitation, an MPEG Layer-3 file, a Wave file, and an audio file format. Subsequently, another Step involves running the file to play the digital multi-genre musical composition track. The user, or members of a network may access and play the final combined multi-genre musical composition track for free, or for a fee. Further, for members of a network, this software application is capable of preserving traditional music bands by allowing each musician to record their session live and arrange collectively or outsource in lieu of one user being their own band, thereby creating enhanced flexibility and user-discretion. Additionally, the present invention of digital composition via a software-based computing system is in no way an attempt to substitute traditional music in its practices, educationally or performances. In fact, it is able to coexist in this forever world of technology as it incorporates, preserves and respects the former application of musicianship. The present invention is all inclusive. In as much as, the final product is capable of being transcribed onto sheet music from anyone qualified who audibly recognizes the notes either from their background or having perfect pitch: thereby, allowing others to play with the written sheet music instrumentally in an ensemble, or for private or personal use. A user may not be able to read the rhythmic patterns as they are, but once transcribed, a user definitely can as well as preserving and respecting the spirit of music and its history.

The method 100 is flexible enough such that a beginner musician, an intermediate musician, or an advanced musician may utilize the tracks, and manipulate them according to one's own level of expertise. For example, a beginning musician can apply the Moore Methodology in the reverse. In this configuration of the method 100, the host and donor songs are already incorporated in all harmonies, with balancing applied, exported, and bounced to a final mix. The final musical composition is edited and manipulated to a semi-coherent state in such a manner that the beginner musician can easily hear and comprehend the tracks. The imbalances and learn of the program to feel comfortable with digital composition. The method 100 allows the beginner musician to learn musical terminology and gain confidence in the art of musicianship at a gradual pace. Afterwards, the beginner musician can be introduced to the final mix, as it actually sounded like. Next, the beginner musician can then personally gauge their own process and achievements because 10 users are capable of having 10 different results. One of which may actually be better than the sample mix from which they were working, since everything is based on one's own experience and interpretation.

In regards to intermediate musician, there is also benefit from the beginner level, or they may choose host and donor tracks of their own. For the intermediate musician, it may be suggested to only use one donor track, as this donor track would stand out from the others this would allow the intermediate musician to concentrate on only that track and not become confused on where to start.

For the advanced musician, there is benefit from either the beginner or intermediate level. However, the advanced musician should be prepared to delve into genre fusion in its entirety. With the proper musical connections, musician should be able to utilize the microphones, instruments, and recorded key signatures and cords. This allows the Moore Methodology to expand by definition, and create multi-genre and multicultural compositions. The assistance of the diverse instruments also allows the experience musician to have a more multicultural experience with a wide array of music in various genres. There are no limitations to the Moore Methodology. There are a host of songs that can be remixed, tracks looped by cutting and splicing multiple variations from one composition are just a few examples that a user can create.

The Method 100 claimed is effective enough that it can progress into arrangement and production thereby giving the user an advantage to learn a skill they would not otherwise know or what is not generally known to the public. In addition to composition, the player or user will also be able to learn the art of composition and production, as it is in direct application, and at times a must, during the digital composition. Arrangement and production are, also, an art that is not known to the general public.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

What is claimed is:

1. A computer-implemented method of digitally composing a multi-genre musical composition with pre-existing digital musical tracks, the method comprising the steps of:

providing a processor operably coupled to a memory resident with a software application operably configured to identify and digitally manipulate a plurality of rhythmic patterns on a digital user interface operable to display on an electronic display;

initiate a musical composition session using the software application, the musical composition session including:

uploading a host digital music track of a first genre and viewing, over the digital user interface, a plurality of digital host musical elements each with a rhythmic pattern having a starting time point and selectively modifiable by a user;

at least one of uploading or composing a donor digital music track of a second genre, different than the first genre, and viewing, over the digital user interface, a plurality of digital donor musical elements each with a rhythmic pattern having a starting time point and selectively modifiable by a user;

bringing a digital play head to a timing point aligned with the starting time points of the rhythmic pattern for each of the plurality of digital host and donor musical elements;

manipulating, after bringing the digital play head to the timing point, at least one of an intensity and a frequency of the rhythmic pattern for at least one of the plurality of digital donor musical elements to generate a modulated donor rhythmic pattern configured to, generate a more harmonic digital multi-genre musical composition; and creating a digital multi-genre musical composition track including the rhythmic pattern of the host digital music track and the modulated donor rhythmic pattern.

2. The method of claim 1, wherein the musical elements comprise a musical instrument or a human vocal.

3. The method of claim 1, wherein the genres include at least one of the following: blues music, jazz music, rhythm and blues music, rock and roll music, rock music, country music, soul music, and dance music.

4. The method of claim 1, further comprising, substituting one or more subsequent donor digital music tracks of a subsequent genre for the donor digital music track of the second genre.

5. The method of claim 1, wherein the step of manipulating, further comprises cutting a portion of the rhythmic pattern from the digital donor musical elements.

6. The method of claim 1, wherein the step of manipulating, further comprises looping a portion of the rhythmic pattern from the digital donor musical elements.

7. The method of claim 1, wherein the step of manipulating, further comprises adding an additional rhythmic pattern to the digital donor musical elements.

8. The method of claim 1, wherein the step of manipulating, further comprises muting the host digital music track, or the donor digital music track, or both.

9. The method of claim 1, wherein the processor includes at least one of the following: a computer, a laptop, a smart phone, a tablet, and an electronic device.

10. The method of claim 1, further comprising, composing the donor digital music track of the second genre, different than the first genre, and viewing, over the digital user interface, the plurality of digital donor musical elements each with the rhythmic pattern having the starting time point and selectively modifiable by the user.

11. The method of claim 1, further comprising:

adjusting the starting time point of the rhythmic pattern to read 00:00 before a user engages in the step of manipulating the intensity and the frequency of the rhythmic pattern for each digital musical element for the at least of the plurality of digital donor musical elements.

12. The method of claim 1, wherein the rhythmic pattern for at least one of the plurality of digital donor musical elements comprises a time code, the time code including at least one of the following: hours, minutes, seconds, and frames.

13. The method of claim 1, further comprising manipulating at least one of an intensity, a frequency, a sound, a beat, and a rhythm of the rhythmic pattern for at least one of the plurality of digital donor musical elements to generate the modulated donor rhythmic pattern configured to, generate the more harmonic digital multi-genre musical composition.

14. The method of claim 1, further comprising, downloading the digital multi-genre musical composition track from the software application and the digital user interface onto the memory.

15. The method of claim 14, further comprising, saving the downloaded multi-genre musical composition track in a file.

16. The method of claim 15, further comprising, running the file to play the digital multi-genre musical composition track.

17. A computer-implemented method of digitally composing a multi-genre musical composition with pre-existing digital musical tracks, the method comprising the steps of:

providing a processor operably coupled to a memory resident with a software application operably configured to identify and digitally manipulate a plurality of rhythmic patterns on a digital user interface operable to display on an electronic display;

initiate a musical composition session using the software application, the musical composition session including:

uploading a host digital music track of a first genre and viewing, over the digital user interface, a plurality of digital host musical elements each with a rhythmic pattern having a starting time point and selectively modifiable by a user;

uploading a donor digital music track of a second genre, different than the first genre, and viewing, over the digital user interface, a plurality of digital donor musical elements each with a rhythmic pattern having a starting time point and selectively modifiable by a user;

bringing a digital play head to a timing point aligned with the starting time points of the rhythmic pattern for each of the plurality of digital host and donor musical elements;

manipulating, after bringing the digital play head to the timing point, at least one of an intensity, frequency, sound, beat, and rhythm of the rhythmic pattern for at least one of the plurality of digital donor musical elements to generate a modulated donor rhythmic pattern configured to, generate a more harmonic digital multi-genre musical composition;

creating a digital multi-genre musical composition track including the rhythmic pattern of the host digital music track and the modulated donor rhythmic pattern;

downloading the digital multi-genre musical composition track from the software application and the digital user interface onto the memory resident on the processor or an external memory drive; and saving the downloaded multi-genre musical composition track in a file.

18. The method of claim 17, wherein the step of manipulating, further comprises cutting or looping a portion of the rhythmic pattern from the digital donor musical elements.

19. A computer-implemented method of digitally composing a multi-genre musical composition with pre-existing digital musical tracks, the method comprising the steps of:

providing a processor operably coupled to a memory resident with a software application operably configured to identify and digitally manipulate a plurality of rhythmic patterns on a digital user interface;

providing an electronic display operably to display a digital user interface;

initiate a musical composition session using the software application, the musical composition session including:

uploading a host digital music track of a first genre and viewing, over the digital user interface, a plurality of digital host musical elements each with a rhythmic pattern having a starting time point and selectively modifiable by a user;

uploading or composing a donor digital music track of a second genre, different than the first genre, and viewing, over the digital user interface, a plurality of digital donor musical elements each with a rhythmic pattern having a starting time point and selectively modifiable by a user;

bringing a digital play head to a timing point aligned with the starting time points of the rhythmic pattern for each of the plurality of digital host and donor musical elements;

adjusting the starting time points of the rhythmic pattern to read 00:00;

manipulating, after bringing the digital play head to the timing point, at least one of the intensity, frequency, sound, beat, and rhythm of the rhythmic pattern for at least one of the plurality of digital donor musical elements to generate a modulated donor rhythmic pattern configured to generate a more harmonic digital multi-genre musical composition, the manipulating step also includes cutting or looping a portion of the rhythmic pattern from the digital donor musical elements;

creating a digital multi-genre musical composition track including the rhythmic pattern of the host digital music track and the modulated donor rhythmic pattern;

downloading the digital multi-genre musical composition track from the software application and the digital user interface onto the memory resident on the processor or an external memory drive;

saving the downloaded multi-genre musical composition track in a file; and running the file to play the digital multi-genre musical composition track.

* * * * *